(No Model.) 2 Sheets—Sheet 1.
W. A. WILCOX.
SAW SHAPING AND SHARPENING DEVICE.
No. 590,869. Patented Sept. 28, 1897.
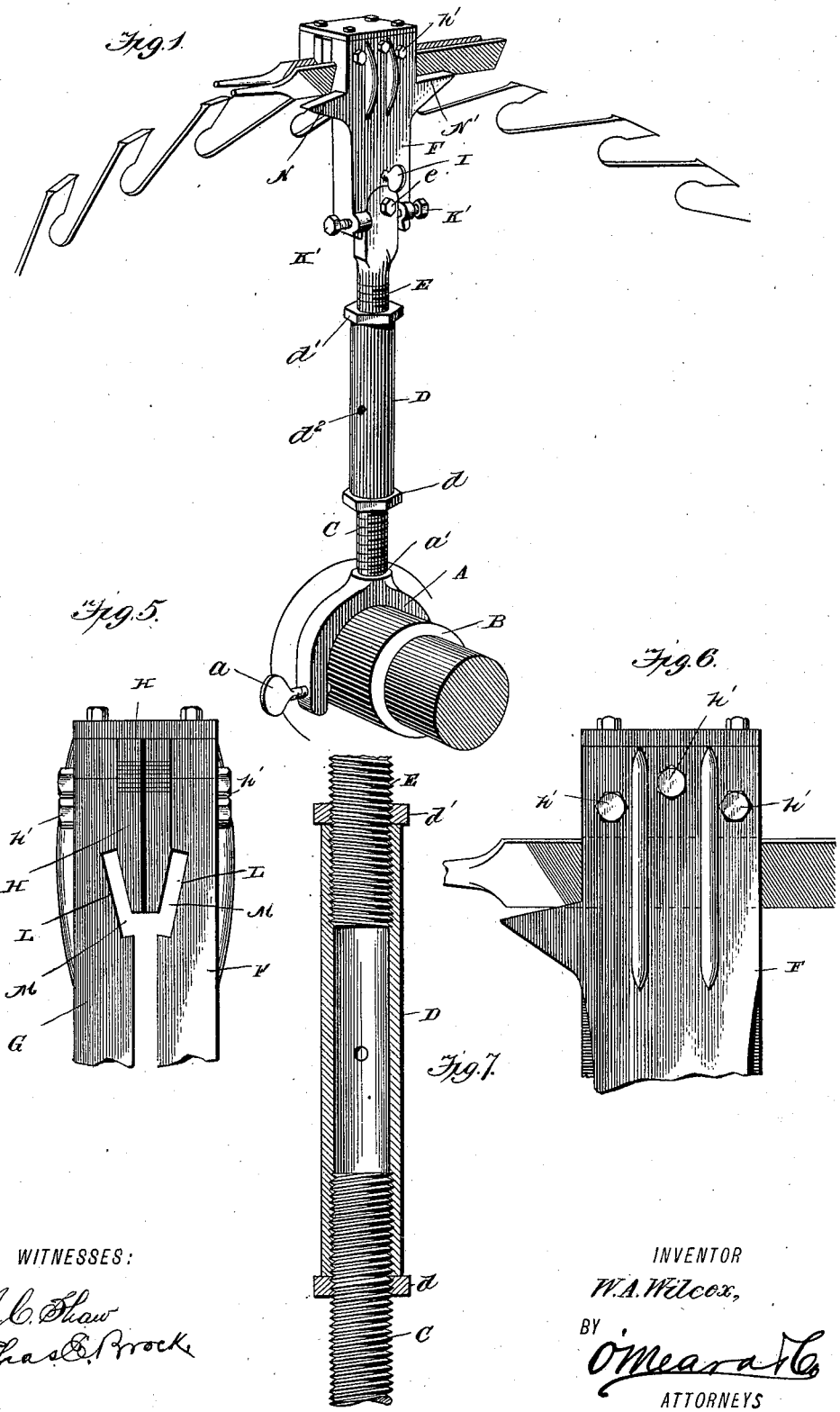
WITNESSES:
J. C. Shaw
Chas. E. Brock
INVENTOR
W. A. Wilcox,
BY O'Meara & Co.
ATTORNEYS (No Model.) 2 Sheets—Sheet 2.
W. A. WILCOX.
SAW SHAPING AND SHARPENING DEVICE.
No. 590,869. Patented Sept. 28, 1897.
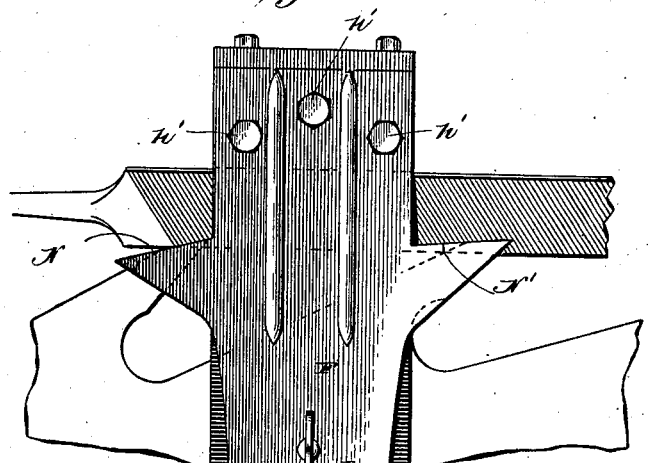
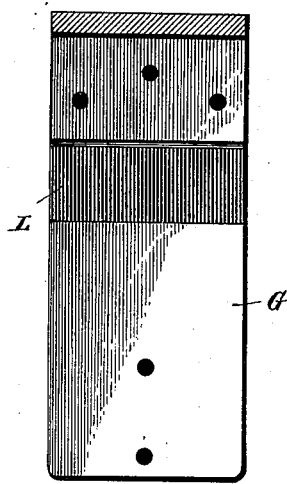
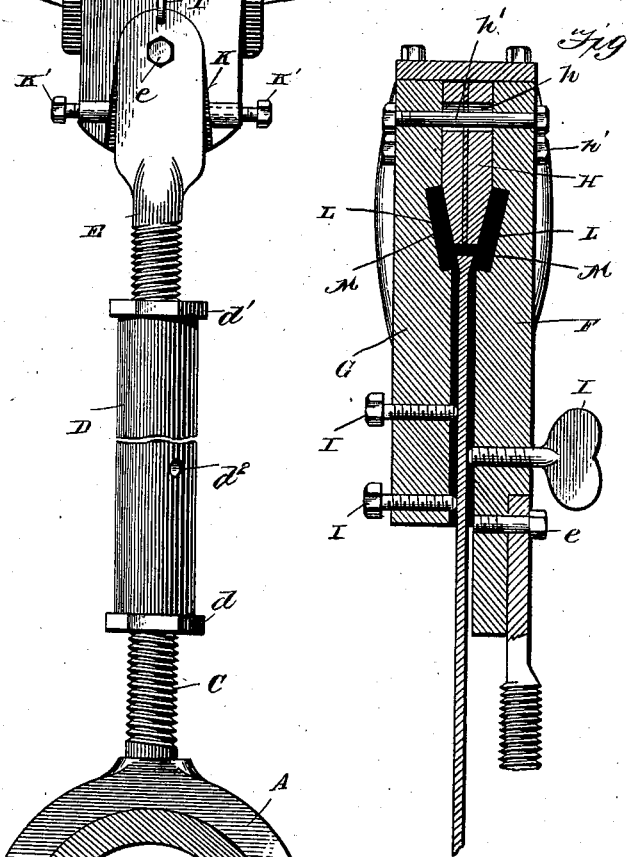
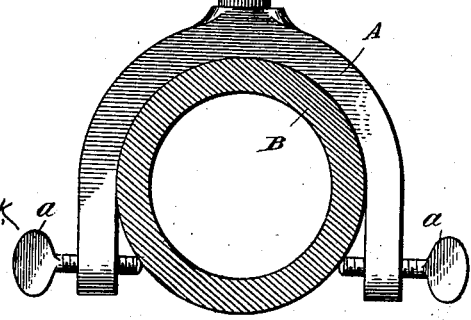
WITNESSES:
INVENTOR
W. A. Wilcox,
BY O'Meara & Co.
ATTORNEYS

UNITED STATES PATENT OFFICE.

W. ASHER WILCOX, OF RICH HILL, MISSOURI, ASSIGNOR OF ONE-HALF TO WILLIAM T. MARSH, OF SAME PLACE.

SAW SHAPING AND SHARPENING DEVICE.

SPECIFICATION forming part of Letters Patent No. 590,869, dated September 28, 1897.

Application filed September 18, 1896. Serial No. 606,276. (No model.)

*To all whom it may concern:*

Be it known that I, W. ASHER WILCOX, residing at Rich Hill, in the county of Bates and State of Missouri, have invented a new and Improved Saw Shaping and Sharpening Device, of which the following is a specification.

This invention is an improved device for rounding, shaping, sharpening, and side-filing circular saws.

Swaging is usually done with a hammer, crotch, or upset, although a swaging tool or machine is sometimes used, and after the swaging the teeth are filed, usually by guess, although gages are sometimes used.

The object of the present invention, therefore, is to provide a device which shall avoid all of these objections, one which can be employed to round or shape the saw in a perfect or true manner the first time around and swage and finish the second time around, or which can be employed to round, shape, swage, and side-file on the first time around the saw.

Another object is to provide a device by means of which all the teeth can be uniformly shaped and sharpened.

Another object is to provide a device which can be applied and operated while the mill or machinery is at a standstill and without removal of the saw from the mandrel.

Another object is to provide a device which can be quickly and easily applied and operated, so that it is little or no inconvenience to dress the saw, and therefore said saw can be constantly attended to and kept in proper condition, whereas by the old method, involving a great deal of time and labor, the rounding was, and often is, neglected for a longer period than it should be.

With these various objects and points in view my invention consists in the peculiar construction of the various parts and in their novel combination and arrangement, all of which will be fully described hereinafter and pointed out in the claims.

In the drawings forming a part of this specification, Figure 1 is a view showing the invention in use. Fig. 2 is a side elevation. Fig. 3 is the inner face of one of the side blocks. Fig. 4 is a transverse vertical section through the head portion. Fig. 5 is a detail end view, and Fig. 6 is a detail side view, showing a slight modification. Fig. 7 is a detail view of connection between the head and yoke, being a slide with right and left bored threads, essentially a turnbuckle.

In carrying out my invention I employ a yoke A, adapted to embrace a mandrel-collar B, said yoke being clamped in position by means of screws $a$.

A threaded socket $a'$ is produced in the top of the yoke, and into which screws one end of a threaded rod C, the opposite end of said rod screwing into a threaded tubular member D, and in the top of this member is screwed another rod E, to which the head-piece is attached, as hereinafter explained. A jam or lock nut $d$ is arranged at the bottom of member D, and a similar nut $d'$ at the upper end.

The member D has a series of openings $d^2$ at the center for insertion of a spike or rod to turn said member, which in operation is essentially a turnbuckle to expand or contract, as desired.

The head portion is composed of the side blocks F and G and the central or top block H, said central block being preferably wedge shape and adjustable between the side blocks, and the central block may be made in two sections to admit paper being inserted, if necessary. The central block has elongated slots $h$, through which pass bolts $h'$, said bolts passing through the side blocks and holding all of said blocks together.

A suitable gage is marked upon the ends of blocks to determine the adjustment of the blocks. The said blocks are so spaced apart that the saw can readily pass between, and in order to hold said saw with the head I employ a series of clamping or binding screws I, which pass through the side blocks and bind upon the saw.

One of the side blocks is attached to the rod E by means of a pivotal bolt $e$, the said block having a recess K, in which the reduced end of the rod rests, said recess being wider at the bottom than at the top and recessed only on outside of block F, (with sufficient projection for adjusting-screws K' K',) the object being to have sufficient space between the saw and rods E and C and member D and jam or lock nuts $d$ $d'$ to turn without striking the saw, and passing through the sides are the adjusting-screws K' K', and by means of which the head portion is adjusted to any desired angle with reference to the supporting-rod.

The inner face of each side block has a horizontal groove or recess L produced therein, the rear wall or face of said groove being inclined parallel with the opposing face of the center block, thus providing an inclined fileway or channel M upon each side of the central block, the bottoms of said fileways extending a short distance below the tooth of saw, and by adjusting the side and central blocks any desired pitch of fileway can be had. Furthermore, both of the side blocks are extended at each edge in the arc of a circle, as shown at N and N', which serve as gages in rounding the saw and reshaping the edge of tooth.

Now in operation the yoke carrying the supporting-rods to which the head portion is attached is secured to the mandrel-collar, and the saw rests between the side blocks and the head portion, as more clearly shown in Fig. 2, and after the head portion is properly adjusted the binding-screws are joined, securely holding the saw-shaping devices together.

In case the saw needs rounding one of the teeth is brought into alinement with one of the curved projections and the edge filed down to correspond with the edge of such projection. In case the opposing face of said tooth needs filing a cross-file is employed and the tooth is operated upon until the edge becomes flush with the under edge of the opposite projection. After one tooth has been properly treated the clamping-screws are released and another tooth brought into the proper position and similarly operated upon, and these operations are continued until every tooth has been rounded the desired extent, thereby rounding or truing the saw.

In case it is desired to swage the saw such operation can be accomplished at the same time or at a different time from the rounding operation, and in order to file the side edges of the teeth, and thereby place all of the teeth upon the same angle, I insert files in the fileways and operate the same back and forth through such ways until the teeth are shaped.

All of the parts of my improved device are adjustable, so that any desired angle or incline can be obtained for the purpose of truing the saw, and, furthermore, the device is adapted for use upon various sizes of saws within a definite limit.

It will thus be seen that I provide an exceedingly simple and efficient device to be used in shaping, sharpening, rounding, and side-filing circular saws, and one which can be applied to the saw at any time while the same is in a state of rest, and one which can be operated and adjusted so easily that the device can be used every day, if so desired, without inconveniencing the operation of the sawmills.

Having thus described my invention, what I claim as new, and desire to secure by Letters Patent, is—

1. A saw sharpening, rounding and shaping machine, consisting of the head portion provided with the side and central pieces, the central pieces being wedge-shaped as shown, the inclined fileways between the side and central pieces, the guide or gage extensions or shoulders, the clamping-screws for binding the head portion and saw, and means for supporting the head portion upon the saw, substantially as shown and described.

2. A saw shaping, rounding and sharpening machine, consisting of the head portion having the side and central blocks or pieces, the central block or piece being wedge-shaped as shown, so as to be adjustable, the inclined fileways between the side and central blocks or pieces, the guide or gage extensions or shoulders, and means for supporting the head portion above the saw, substantially as shown and described.

W. ASHER WILCOX.

Witnesses:
C. A. BARROWS,
R. F. HULETT.